June 9, 1936.  N. SINGER  2,043,840

OPHTHALMIC LENS

Filed June 23, 1934

INVENTOR.
Nathaniel Singer.
BY
ATTORNEYS.

Patented June 9, 1936

2,043,840

UNITED STATES PATENT OFFICE 2,043,840

OPHTHALMIC LENS

Nathaniel Singer, New York, N. Y., assignor to Optical Research Corporation, New York, N. Y., a corporation of New York Application June 23, 1934, Serial No. 732,123

2 Claims. (Cl. 88—54)

My invention relates to opthalmic lenses. It has to do, more particularly, with single vision lenses, although the principles of my invention are also applicable to multifocal lenses.

In the past there have been many various types of lenses devised which have been provided with colored or tinted areas to protect the eyes from abnormally bright rays of light. However, no attention whatsoever has been given to the distinction between direct vision and indirect vision and, consequently, such prior art lenses have been made without regard at all to direct vision and indirect vision and their relation to each other. Several lenses have been devised with a clear central area completely surrounded by a protecting area of colored or tinted glass. However, because no consideration has been given to the theories of direct and indirect vision and their relation to each other, these lenses have been designed more or less haphazardly, with the central clear areas of no definite size. In other words, the central clear areas of these lenses have been made of certain sizes without having any good reason for making them of a particular size.

The human eye is endowed with two kinds of vision: direct and indirect. Direct vision is confined to a very narrow visual angle. It covers a smaller area than that of a ten cent piece held at arm's length. If a ten cent piece is held in the hand, it will be found that the words thereon cannot be read without "directing" the vision first on one word and then on another. Direct vision is macular vision and it is only by means of direct vision that we are able to perceive detail.

Indirect vision embraces all of the area within the range of sight except the narrow cone of direct vision. It is impossible to obtain a clear conception of what we see in the indirect field of sight. The indirect field enables us to perceive gross objects, masses of color and particularly, moving objects. The act of seeing consists of noticing a mass of color, or movement within the indirect field, and then turning our eyes to bring the object that we have just noticed into the direct line of sight. Then we perceive what it is and notice its details. Indirect vision is rod vision and is physiologically different from cone vision or macular vision in the direct line of sight.

Glare can be defined as light that interferes with vision instead of contributing to it. Glare might be defined also as light that is not wanted, or subjectively, as the discomfort that is occasioned by excessive light within the range of vision. Common experience shows that glare as a phenomenon, is generally evident in the indirect field. As a rule, we do not notice an excessive amount of illumination on an object at which we are looking, even under conditions of glare. The discomfort we experience comes from the indirect field. The light reflected into our eyes by the sand at the sea shore, by the side-walk and pavement, by the snow-covered ground in winter, causes discomfort, even though the object at which we are looking directly may not be brightly illuminated. As soon as glare is eliminated from the indirect field we obtain satisfactory vision in the direct line of sight.

I have carefully considered the theories of direct and indirect vision and their relation to each other, and have designed my lens with these theories in mind.

One of the objects of my invention is to provide a lens which has a clear glass area which is completely protected by a surrounding area of tinted or colored glass.

Another object of my invention is to provide a lens of the type indicated wherein the clear glass area will be of such an extent that even as the line of direct vision moves from side to side, or up and down, it will ordinarily pass through the central area of clear glass and will not pass through the surrounding area of tinted or colored glass.

In its preferred form, my invention contemplates the provision of a lens which has a central visual area of clear white glass. This central area is completely surrounded by colored or tinted glass. The central clear area is of such an extent that when the lens is placed before the eye, the line of direct vision may shift up and down and to each side of the center of direct vision and the line of direct vision will still pass through the central area of clear white glass. Thus, the intensity of light from an object seen in the direct field will not be reduced. However, the brightness of objects and light in the peripheral field of vision outside of the angle of direct vision will be reduced. Thus, the line of direct vision will ordinarily pass through an area of clear white glass which will not interfere at all with such vision. The surrounding area of colored or tinted glass will prevent strong rays of light in the indirect field of vision from interfering with direct vision. Because of this surrounding area of colored or tinted glass, glare will be materially reduced or will be practically eliminated.

In the accompanying drawing, I have illustrated diagrammatically several lenses made in accordance with my invention.

Figures 1 to 5, inclusive, show several lenses with various shapes, preferably being provided with a central area of circular form disposed substantially at the center thereof and composed of clear white glass and being surrounded by an area of tinted or colored glass.

Figure 1:
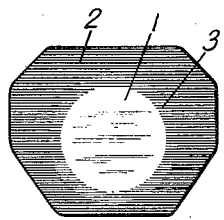
Figure 2:
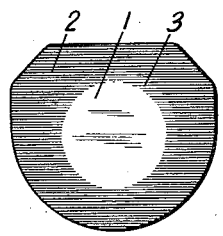
Figure 3:
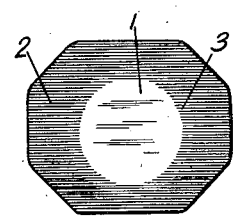
Figure 4:
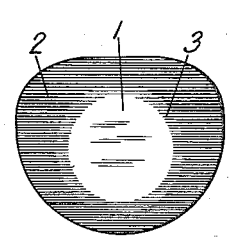
Figure 5:
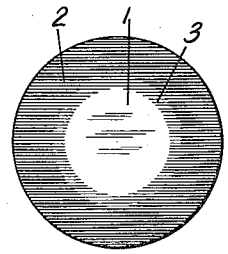

It will be apparent from the drawing that I have provided a lens which is composed of a central visual area which is made preferably of clear white glass. This central area 1 is preferably of circular form and is of a certain predetermined size, as will be described more in detail hereinafter. This central clear area 1 is completely surrounded by an area 2 of glass which is preferably colored, or tinted. This tinted or colored area 2 protects the central clear area 1, as will later appear.

Figure 6:
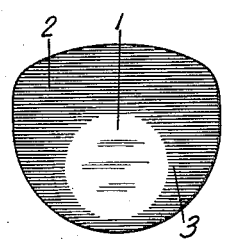
Figure 6 illustrates a lens having the central clear area disposed eccentrically thereof.

In Figures 1 to 5, inclusive, I have shown lenses having various outlines. It will be apparent that lenses of any desired outline may be provided. In these figures, the central clear area 1 is shown substantially at the center of the lens. However, in Figure 6, the central area 1 is shown as being displaced below the center of the lens. It may be desirable, under certain circumstances, to have the area 1 displaced from the center of the lens.

My lens may be made by any suitable method. It may either be made in one piece or it may be made of two or more pieces. In case it is made of a single piece the outer area corresponding to the area 2 is treated in such a manner that it will become tinted or colored and will have higher light absorptive properties than the glass of the central area 1.

However, I preferably make my lens of a piece of clear white glass, corresponding to the area 1, which is fused to a second piece of glass corresponding to the area 2. This second piece of glass is tinted or colored, or has higher light absorptive properties than the glass of the area 1.

Figure 7:
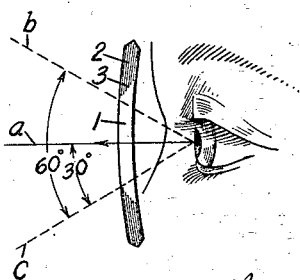
Figure 7 is a diagrammatic illustration of one of my lenses before an eye, illustrating how the direct line of vision will ordinarily pass through the central clear area.
Figure 8:
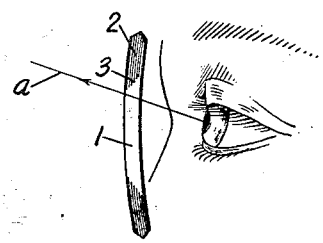
Figure 8 is a diagrammatic view similar to Figure 7, showing the direct line of direct vision shifted upwardly as far as possible.

If this last-mentioned method is used for producing my lens, the two pieces of glass are preferably joined along a gradually inclined wall 3 as indicated in Figures 7 and 8. Also, the area 2 need only be slightly tinted in comparison with the glass of the area 1, and due to this slight distinction only between these two pieces of glass and to the inclined junction wall 3, the tinted portion diminishes gradually in intensity towards the center so that it blends almost imperceptibly with the clear white central portion.

As previously stated, in designing my lens I have given careful consideration to the distinction between direct vision and indirect vision. Consequently, I propose to have the central visual area 1 of a predetermined size.

The clear white glass portion 1 is of a predetermined area so that the line of direct vision will, with the normal excursion of the eyeball, always pass through this clear portion when vision occurs within the normal angle of direct vision. In Figures 7 and 8, I have illustrated a lens placed before an eye and have shown how the line of direct vision will normally pass through the central clear portion 1 of glass.

The normal visual range occurs through an angle of approximately 60 degrees. When the eyeball is in its normal position, the line of direct vision is straight ahead and this is the center of direct vision. As the eyeball turns in the socket, the line of direct vision moves from side to side, or up and down, so that it may be directed 30 degrees up or down from the center of direct vision or 30 degrees to either side of the center of direct vision. In other words, by shifting the eyeball, the line of direct vision may be shifted in any direction within 30 degrees from the center of direct vision.

Thus, in Figures 7 and 8, I show one of my lenses placed before the eye with the center of the central area 1 substantially coinciding with the line of direct vision when the eyeball is in its normal position. This line of direct vision is indicated by the line "a". However, if the eyeball is shifted, the line of direct vision will shift. In my lens, the clear white glass portion 1 preferably covers a visual angle of 60 degrees, as indicated by the dotted lines "b" and "c" in Figure 7. It will be apparent that the eye may thus shift up and down, or from one side to the other, through a visual angle of 60 degrees and the line of vision will still be through the area 1 of clear white glass. The line of direct vision may move from side to side, or up and down, so that it may pass through my lens anywhere within 30 degrees from the center. In the preferred form of my lens, I provide clear glass within this entire area and colored or tinted glass outside of this area. In Figure 8, the line of direct vision indicated by line "a" is shown shifted upwardly as far as possible. This shows how the line of direct vision will still pass through the clear white glass area 1.

It will be apparent from the above description that I have provided a lens having many desirable characteristics. I have designed my lens in such a manner that direct vision will ordinarily occur through a clear white portion of glass which will not reduce the intensity of light from an object seen in the direct field. However, a tinted or colored area is provided in surrounding relation to the clear white area and reduces the brightness of objects and light in the indirect field of vision.

My lens is particularly adaptable to persons whose eyes are sensitive to glare and yet who find that a lens tinted throughout its entire area is not completely satisfactory. my lens is provided with means for substantially eliminating glare, but is of such a type that direct vision will ordinarily occur through a portion of glass which is not tinted and, consequently, which does not reduce the intensity of light of objects in the direct field of vision.

Although I have described my lens as comprising a clear white central portion surrounded by a portion of tinted or colored glass, it will be apparent that I may make the central portion of tinted or colored glass, and the surrounding portion of darker tinted or colored glass than the central portion.

Moreover, the central portion may be made of glass having higher light absorptive properties than the surrounding portion. Thus, the central portion might be made of colored or tinted glass and the surrounding portion of clear white glass. Such a lens would be useful in those cases requiring reduction of intensity in the direct line of sight, and all the light possible in the indirect field. Such a case would be one in which the peripheral parts of the retina are relatively insensitive and irresponsive to light, as compared with the macula.

Also, although I preferably make the central portion of my lens of circular form, it will be apparent that it may be made of other shapes.

Having thus described my invention, what I claim is:

1. An ophthalmic lens made from a plurality of pieces of optical glass fused together comprising a main central portion composed of glass which is transparent and is of one light absorptive quality and a surrounding border portion composed of glass which is transparent and which has inherently in the glass thereof higher light absorptive qualities than the glass of said central portion, said central portion of the glass forming the main visual area of the lens through which vision normally occurs and the said surrounding border portion of glass of higher light absorptive qualities forming a protecting border through which vision may occur and which obviates glare from rays of light of the indirect field of vision but still permits the passage of such rays of light therethrough, said border portion being joined to said central portion along a gradually inclined wall of such an inclination that the two areas of the lens gradually merge with each other, said surrounding border portion extending substantially through the full thickness of the lens at the edge thereof so as to completely protect the central visual area, the innermost edge of said surrounding border portion terminating at such a point that the visual area within said border portion will cover a visual angle of approximately 30 degrees in any direction from the center of direct vision so that the eye may obtain direct vision therethrough in all its normal excursions, the front and rear surfaces of said main central portion of glass being continuations of the corresponding surfaces of said border portion of glass.

2. An ophthalmic lens comprising a main central portion composed of glass which is transparent and is of one light absorptive quality and a surrounding border portion composed of glass which is transparent and which has inherently in the glass thereof higher light absorptive qualities than the glass of said central portion, said central portion of the glass forming the main visiual area of the lens through which vision normally occurs and said surrounding border portion of glass of higher light absorptive qualities forming a protecting border through which vision may occur and which obviates glare from the rays of light of the indirect field of vision but still permits the passage of such rays of light therethrough, said surrounding border portion being of substantial width so as to completely protect the central visual area, the innermost edge of said surrounding border portion terminating at such a point that the visual area within said border portion will cover a visual angle of approximately 30 degrees in any direction from the center of direct vision so that the eye may obtain direct vision therethrough in all its normal excursions, the front and rear surfaces of said main central portion of glass being continuations of the corresponding surfaces of said border portion of glass.

NATHANIEL SINGER.